United States Patent
Bulow et al.

(10) Patent No.: US 7,581,326 B1
(45) Date of Patent: Sep. 1, 2009

(54) OPTICAL SOLID-STATE HEADING SENSOR

(75) Inventors: Jeffrey A. Bulow, Syracuse, NY (US);
Marcus B. Niessen, Liverpool, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/347,630

(22) Filed: Dec. 31, 2008

(51) Int. Cl.
*G01C 17/38* (2006.01)

(52) U.S. Cl. .......................... 33/355 R; 33/356; 702/92

(58) Field of Classification Search ............... 33/355 R, 33/356–359, 361; 455/456.1; 701/3, 120; 702/92
See application file for complete search history.

(56) References Cited

U.S. PATENT DOCUMENTS

| | | | |
|---|---|---|---|
| 4,851,775 A | 7/1989 | Kim et al. | |
| 5,173,882 A | 12/1992 | Watson | |
| 5,239,264 A | 8/1993 | Hawks | |
| 5,255,442 A | 10/1993 | Schierbeek et al. | |
| 5,315,370 A * | 5/1994 | Bulow | 359/245 |
| 5,526,022 A | 6/1996 | Donahue | |
| 5,583,636 A * | 12/1996 | Bulow | 359/245 |
| 6,128,110 A * | 10/2000 | Bulow | 359/108 |
| 6,512,975 B2 | 1/2003 | Watson | |
| 7,248,983 B2 * | 7/2007 | Fillatreau et al. | 33/356 |
| 7,299,057 B2 | 11/2007 | Anderson | |
| 7,313,404 B2 | 12/2007 | Anderson | |
| 7,331,115 B2 | 2/2008 | Schierbeek et al. | |
| 7,375,654 B2 | 5/2008 | Culpepper et al. | |
| 7,460,292 B2 * | 12/2008 | Chou | 359/291 |
| 7,515,327 B2 * | 4/2009 | Cummings | 359/290 |
| 2007/0225929 A1 * | 9/2007 | Sato et al. | 702/92 |
| 2008/0120054 A1 * | 5/2008 | Parks et al. | 33/355 R |

* cited by examiner

*Primary Examiner*—Yaritza Guadalupe-McCall
(74) *Attorney, Agent, or Firm*—Howard IP Law Group, PC (57) ABSTRACT

A heading sensor includes a housing containing an interferometer having a mirror movable in response to fluctuations in a gravitational force applied to the housing. The interferometer, responsive to a light beam, generates an optical signal modulated according to the relative displacement of the mirror. The housing further includes an electromagnetic coil positioned along an axis of the housing for generating a current signal indicative of fluctuations in a magnetic field applied to the housing. The heading sensor also includes a processor for determining a local gravitational field component according to the optical signal and a local magnetic field component according to the current signal.

27 Claims, 6 Drawing Sheets

OPTICAL SOLID-STATE HEADING SENSOR

FIELD OF THE INVENTION

The invention relates generally to heading sensors, and more particularly to an optical solid-state heading sensor.

BACKGROUND OF THE INVENTION

In navigation systems, a heading represents the direction a vehicle is facing or pointing. Ocean-going vessels use heading sensors to monitor the location and the orientation of the vessels as well as objects towed by such vessels. For example, towed array sensors require heading sensors to monitor and control the location and the orientation of the towed array sensors. In some configurations, three sensors are used to measure the gravitational field strength in a full spatial (3-axis) orientation and three other sensors are used to measure the magnetic field strength also in the full spatial (3-axis) orientation. Other approaches include use of compass cards, magnetometers mounted on float assemblies, and capacitive/electrostatic field strength accelerometers. However, these approaches suffer from various deficiencies such as limited accuracy across different latitudes, susceptibility to damage from mechanical shock, and lack of stability and repeatability. Alternatives are desired.

SUMMARY OF THE INVENTION

According to an aspect of the present invention, a heading sensor includes a housing containing a laser source producing a constant wave (CW) optical signal incident on an interferometer having a mirror movable in response to fluctuations in a gravitational force applied to the housing. The CW optical signal, responsive to the moving mirror, generates a modulated optical signal, the signal being modulated according to the relative displacement of the mirror. The housing further includes an electromagnetic coil positioned along an axis of the housing for generating a current signal indicative of fluctuations in a magnetic field applied to the housing. The heading sensor also includes a processor for determining a local gravitational field component according to the optical signal and a local magnetic field component according to the current signal.

According to an aspect of the present invention, an optical solid-state heading sensor includes a housing containing an interferometer. The interferometer includes a beam splitter arranged to receive a light beam along an optical axis from the light source and to split the received light beam into first and second light beam components. First and second mirrors are positioned so as to direct the first and second light beam components back to the beamsplitter. The reflected light beams recombine as a function of relative phase modulating the optical output to an output port. The first mirror is positioned at a fixed predetermined distance from the beam splitter. The second mirror is movably positioned, along the optical axis, with respect to the beam splitter. An optical detector is coupled to the output port and is responsive to the resultant of the combined first and second light beam components, to generate an output signal indicative of a phase difference therebetween. The housing further includes a weight coupled to the second mirror and movable along the optical axis responsive to the ambient gravitational field. The sensor further includes an electromagnetic coil for generating an electric current responsive to the ambient magnetic field. The electromagnetic coil is positioned along a second axis of the housing. A control module or processing module (e.g. CPU or processor) receives the sensor signals and calculates or determines the relative, local gravitational field strength along the optical axis and the relative, local magnetic field strength along the same axis in accordance with the position and geometry of the coil, and according to the fluctuations in the electric current and to the output signal from the optical detector. It is understood that the processing functionality may be configured as one or more processing modules or processors for receiving sensor signal data and/or control signal information and providing output signals indicative of the local components of the gravitational and magnetic fields.

According to an aspect of the invention, an inertial measurement sensor includes a light source and a beam splitter arranged to receive a light beam from the light source and to split the light beam into first and second light beam components. A first mirror is positioned at a fixed distance from the beam splitter. A second mirror is movably positioned with respect to the beam splitter. An optical detector is positioned to receive the resultant of the combined first and second light beam components reflected via the first and second mirrors, respectively. A position bias actuator is mechanically coupled to the second mirror. A weight is coupled to the actuator. The sensor further includes a control module to measure and control the position of the second mirror. The position of the second mirror changes responsive to the changes in the ambient gravitational field strength.

According to an aspect of the invention, a method for determining assembly heading includes a step of, in a first device having a first, second, and third interferometers each having a mirror movable along first, second, and third optical axes respectively, determining a local gravitational field strength component along each of the first, second, and third optical axes using said mirrors, wherein said mirrors move along said respective optical axes responsive to fluctuations in the strength of the local gravitational field along the optical axes. The method further includes a step of, in the first device further having first, second, and third electromagnetic coils, determining a local magnetic field strength component along the first, second, and third coil axes, wherein each of the electromagnetic coils generates a current signal indicative of fluctuations in the strength of the local magnetic field along the coil axes. The method further includes a step of determining the strengths of local gravitational field and local magnetic field, based on the mirror movements and the current signals for determining a heading of the first device.

BRIEF DESCRIPTION OF THE DRAWINGS

Understanding of the present invention will be facilitated by consideration of the following detailed description of the exemplary embodiments of the present invention taken in conjunction with the accompanying drawings, in which like numerals refer to like parts and in which.

DETAILED DESCRIPTION OF PREFERRED EMBODIMENTS

The invention and its various embodiments can now be better understood by turning to the following detailed description of the exemplary embodiments which are presented as illustrated examples of the invention defined in the claims. It is expressly understood that the invention as defined by the claims may be broader than the illustrated embodiments described below. It is to be understood that the figures and descriptions of the present invention have been simplified to illustrate elements that are relevant for a clear understanding of the present invention, while eliminating, for purposes of clarity, many other elements found in typical heading sensors, interferometers and magnetometers. However, because such elements are well known in the art, and because they do not facilitate a better understanding of the present invention, a discussion of such elements is not provided herein. The disclosure herein is directed to all such variations and modifications known to those skilled in the art.

Figure 1:
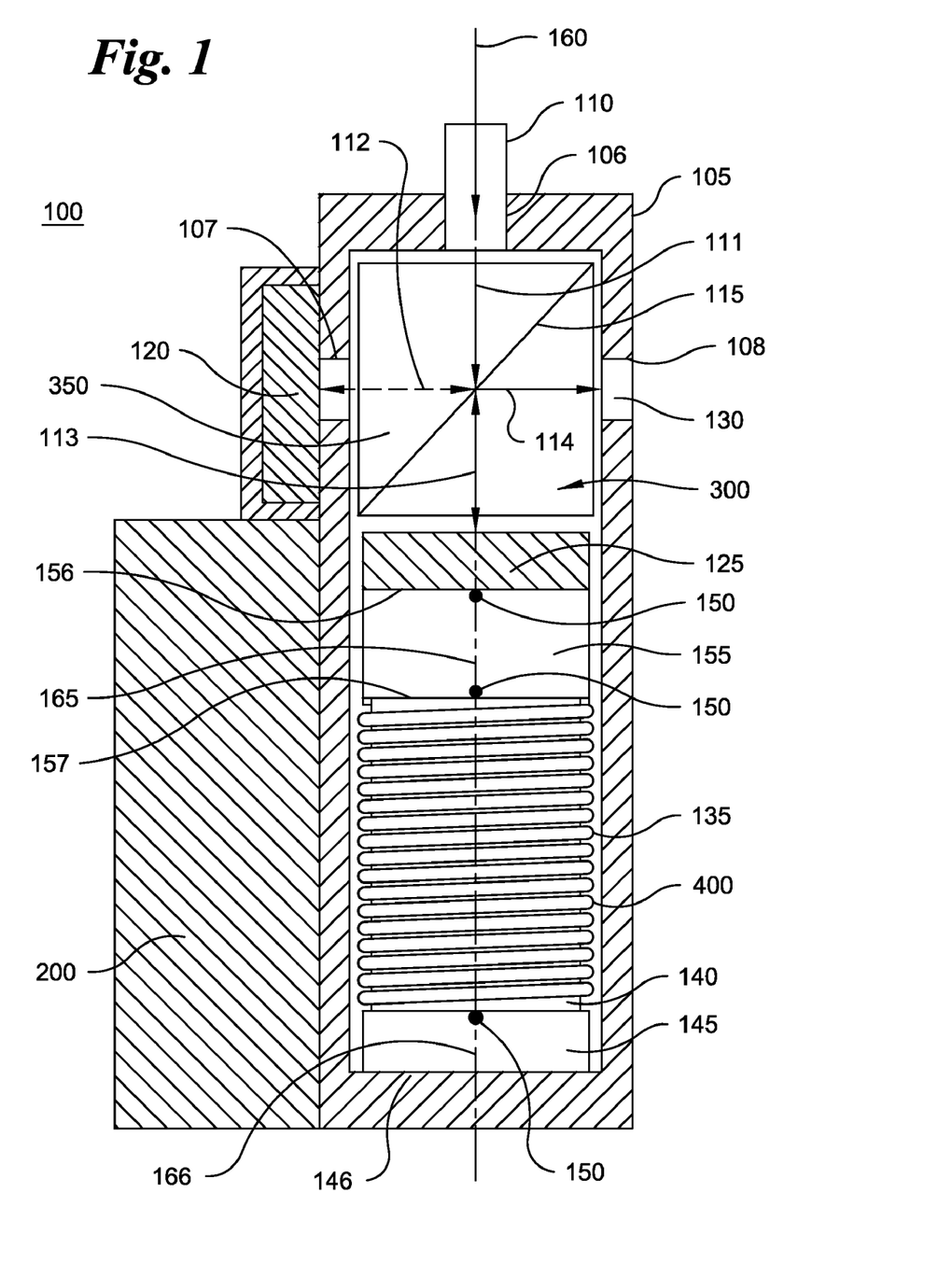
FIG. 1 is a schematic configuration of a heading sensor, according to an embodiment of the invention.

Referring initially to FIG. 1, a heading sensor 100 is schematically illustrated. Heading sensor 100 is adapted to measure changes in the gravitational field strength as well as magnetic field strength, independently from one another. Heading sensor 100, therefore, includes an interferometer assembly 300 for detecting and measuring changes in the gravitational field strength, a solid state magnetometer 400 for detecting and measuring the changes in the ambient magnetic field strength and a control/power module 200 which controls interferometer assembly 300 and magnetometer 400. Interferometer assembly 300 and magnetometer 400 are located in a housing 105. Control/power module 200 is located adjacent to housing 105, in an exemplary embodiment on the invention. In other embodiments, module 200 may be located within housing 105. In an exemplary embodiment, housing 105 is generally cylindrical, having a central axis 160, and adapted to accommodate interferometer assembly 300 and magnetometer 400 in stacked fashion relative to central axis 160.

Interferometer assembly 300 includes a beamsplitter 350, a light source 110, a position bias actuator 155, a weight 140, a force detector 145, and an optical detector 130. In an exemplary embodiment, interferometer 350 may be a Michelson interferometer. Other types of interferometers, such as Tynman-Green interferometer, may also be used. Interferometer 350 includes a beam splitter 115 responsive to light source 110, first and second mirrors 120, 125, and an optical detector 130. In an exemplary embodiment, light source 110 may be a coherent light source such as a laser source. For example, the laser source may be a continuous wave or continuous waveform (CW) laser having a constant amplitude and frequency, such as, a helium neon laser. The term "coherent light source" includes any light source which produces a single phase or a constant relative phase light of a given frequency. Coherent light source 110 may be any narrow band wavelength electromagnetic source including but not limited to an ultra violet, visible or infra-red source. In one embodiment, light source 110 may have an exemplary spectral wavelength of 632.8 nanometers. One of ordinary skill in the art would understand that other spectral wavelengths (e.g., in visible or infra-red (IR) range) may also be used. It is noted that the measurement precision depends on the wavelength, wherein the measurement precision will go approximately as the frequency of the optical source.

Light source 110 is positioned along an optical axis 165 such that a light beam 111 emanating from light source 110 travels along optical axis 165. In an exemplary embodiment, optical axis 165 coincides with central axis 160.

In an exemplary embodiment, housing 105 includes three windows or apertures 106, 107, 108. Aperture 106 may accommodate light source 110 or may provide a pathway for light beams received from a remote light source. In an exemplary embodiment, beam splitter 115 may take a form of two triangular glass prisms affixed together at their bases. In other embodiments, beam splitter 115 may be a half-silvered mirror. Beam splitters and mirrors are known in the art, and further description is not provided for sake of brevity.

Still referring to FIG. 1, beam splitter 115 is positioned across optical axis 165 such that a light beam 111 from light source 110 is partially reflected by beam splitter 115 and partially transmitted by beam splitter 115. In an exemplary embodiment, beam splitter 115 may be positioned at an angle of about 45° with optical axis 165 of housing 105. Aperture 107 enables light beam 112 to impinge upon and be reflected by mirror 120. Mirror 120 is located at a fixed predetermined distance relative to beam splitter 115 and housing 105 and is generally parallel to optical axis 165. Mirror 125 is positioned generally perpendicular to optical axis 165 of housing 105 facing light source 110. Mirror 125 has one functional degree of freedom along optical axis 165. The distance between mirror 125 and beam splitter 115, along optical axis 165, changes responsive to the changes or fluctuations in strength of the local gravitational field applied to weight 140. In an exemplary embodiment, aperture 108 accommodates optical detector 130. Optical detector 130 is so positioned to detect a the relative amplitude of the resultant optical signal modulated by the dynamic phase difference associated with light beams reflected by first and second mirrors 120, 125 and ultimately reflected and transmitted by beam splitter 115.

As shown in FIG. 1, a light beam 111 from light source 110 is split into two identical orthogonal light beam components 112, 113 by beam splitter 115. In the exemplary embodiment, light beam 112 is reflected by mirror 120 and transmitted via beam splitter 115 to optical detector 130. Beam 113, on other hand, is reflected by mirror 125 and again reflected by beam splitter 115 onto optical detector 130. As is known in the art, the difference in the distances traveled by each light beam 112, 113 creates a phase difference between light beams 112, 113. Since mirror 125 is movable along optical axis 165, along with weight 140 which moves in response to the changes or fluctuations in gravitational field strength, the path length traveled by light beam 113 changes in response to the change in gravitational field strength. As the path length traveled by light beam 112 is fixed (except as might change slowly due to thermal effects, discussed in more detail later), the change in the path length of light beam 113, is manifested as a modulated amplitude of the resultant beam 114 generated by the dynamic phase difference between light beams 112, 113, and, which dynamic phase difference is indicative of the change in the gravitational field strength. The phase difference between light beams 112, 113 gives rise to the amplitude modulation of resultant beam 114 that is detected by optical detector 130 which generates an output signal proportional to the change in the gravitational field strength.

Referring still to FIG. 1, mirror 125 is mechanically coupled to position bias actuator 155, for example, by using a layer of adhesive or epoxy between the adjacent surfaces of mirror 125 and actuator 155. In an exemplary embodiment, actuator 155 is a piezo-activated DC actuator. In an exemplary embodiment, actuator 155 is a ceramic device that changes its dimension in a given direction in response to an imposed voltage, while retaining other properties, such as weight and other dimensions, constant. The change in the dimension, responsive to the imposed voltage, is imperceptible from a macroscopic perspective, but substantial when compared with optical wavelengths. In an exemplary embodiment, actuator 155 changes its dimension along optical axis 165. Actuator 155 has a top metallic surface 156 and a bottom metallic surface 157, according to an exemplary embodiment of the invention for the purpose of conveying an electrical signal. Actuator 155 is further coupled to calibrated weight 140, for example, by using a layer of adhesive or epoxy between the adjacent layers of actuator 155 and weight 140. Weight 140 moves, along central/optical axis 165, responsive to the strength of the gravitational field as a function of the orientation of heading sensor 100 in the gravitational field.

For example, in the position of heading sensor 100 illustrated in FIG. 1 (i.e., vertical position), a maximum gravitational force will be exerted on weight 140 causing weight 140 to move in a downward direction along central/optical axis 165. When heading sensor 100 is positioned in a horizontal position, weight 140 does not move along optical axis 165 of housing 105. In an exemplary embodiment, weight 140 is made of a non-ferrous and relatively non-compressible material, such as a hardened metal or inert ceramic. Weight 140 has a polished surface to minimize friction with other components in housing 105. The term "non-ferrous" is used to indicate a material which is neither magnetized by an external magnetic or electromagnetic field nor influenced by subtle changes in the earth's local magnetic field strength nor the changing magnetic field resulting from the current induced in the coil by the same. In an exemplary embodiment, weight 140 may be made of copper or aluminum and has a low thermal resistivity.

Actuator 155 operates to fine tune the position of mirror 125 relative to beam splitter 115 in a gravitational field of known strength responsive to signals received from control module 200. For example, when heading sensor 100 is in a horizontal position, rotated about 90° from the position illustrated in FIG. 1, mirror 125 should be at a known distance from beam splitter 115 relative to the distance of mirror 120 from beam splitter 115 (e.g., at an equal distance). If because of manufacturing defects or other unrelated defects, mirror 125 is not so positioned, optical detector 130 detects some interference. Position bias actuator 155 is activated by control module 200 to calibrate and position mirror 125 in the ideal position in which no interference or a predetermined level of interference is detected by optical detector 130. Responsive to a signal from control module 200, a voltage is imposed on actuator 155 at the metal surfaces, 156 and 157 which results in a change in the size, (e.g., an expansion or a contraction), of actuator 155 along the optical axis 165. Such a change in size of actuator 155 moves second mirror 125, along optical axis 165, to a desired position, which is confirmed by the level of interference detected by optical detector 130. Actuator 155 may also be used to compensate for thermally induced changes in the height of weight 140 during operation. Based on the coefficients of thermal expansion of material of weight 140, change in the height of weight 140, along optical axis 165, for a given change in temperature can be calculated. Based on the temperature measured by temperature sensor 150, actuator 155 may be activated by control module 200 to compensate for thermally induced changes in the height of weight 140. Thus, actuator 155 may also be used for dynamic real-time temperature compensation for weight 140.

Weight 140 is mechanically coupled to force detector 145, for example, using a layer of adhesive or epoxy between weight 140 and force detector 145. In an exemplary embodiment, force detector 145 is a piezo ceramic device although other such force detector devices are of course contemplated. Mirror 125, position bias actuator 155, weight 140 and force detector 145 are all coupled sequentially to form a unitary structure, which entire unitary structure is adapted to move along optical axis 165 of housing 105 responsive to the change in the strength of the gravitational field when heading sensor 100 is positioned accordingly. In one embodiment, mirror 125, actuator 155, weight 140 and force detector 145 are cemented together using an epoxy or other such mechanisms known in the art, such that the ability of actuator 155 or force detector 145 to perform is not impaired. The adjacent surfaces of mirror 125, actuator 155, weight 140, and force detector 145 are prepared for cementing these elements together to form a single stack.

Still referring to FIG. 1, force detector 145 is coupled to housing 105 at a first surface 146, for example, by using a layer of adhesive or epoxy between the adjacent surfaces of force detector 145 and housing 105. In this manner, the motion of weight 140 results in an expansion or a contraction of piezo force detector 145 along optical axis 165. The motion of weight 140 also results in a movement of position bias actuator 155 and mirror 125 along optical axis 165 of housing 105.

Piezo force detector 145 may also function as a calibration tool for each heading sensor 100 and may also serve as a check on the functioning of interferometer 350 and optical detector 130. The forced exerted by weight 140 on force detector 145, along optical axis 165, is a function of strength of the gravitational field acting on weight 140, along optical axis 165, as well as the orientation of sensor 100 and therefore may be used to determine the ambient gravitational field strength, along optical axis 165, for a known orientation of sensor 140. Thus, in a gravitational field of a known strength and for a known orientation of heading sensor 100, the gravitational field strength determined based on the force exerted by weight 140 should be the same as that indicated by the phase difference in light beams detected by optical detector 130. Any difference therebetween may be used to calibrate heading sensor 100.

Still referring to FIG. 1, solid state magnetometer 400 will now be described. Magnetometer 400 includes an electromagnetic coil 135. In an exemplary embodiment, coil 135 is positioned along a second or coil axis 166 without contacting weight 140. Thus, weight 140 is free to move about optical axis 165 of housing 105 relative to coil 135. In an exemplary embodiment, second or coil axis 166 coincides with optical axis 165 and/or central axis 160. In one embodiment, coil 135 surrounds weight 140, in which case second or coil axis 166 coincides with optical axis 165. In other embodiments, coil 135 may be above or below weight 140, next to or adjacent thereto. The term "electromagnetic coil" is intended to include a coil in which an electric current is generated responsive to changes in an ambient magnetic field, for example, the earth's local magnetic field. In an exemplary embodiment, electromagnetic coil 135 is made of copper wire. Coil 135 is electrically coupled to control module 200 to provide output information thereto.

By way of example, for heading sensor 100 as oriented in FIG. 1, when a maximum local gravitational field strength is detected by interferometer 350 and optical detector 130 and force detector 145 is in compression, it is indicated that a maximum force is exerted by weight 140 on piezo force detector 145, and that heading sensor 100 is in a vertical position as illustrated in FIG. 1. On other hand when, when a maximum gravitational field strength is detected by interferometer 350 and optical detector 130 and force detector 145 is in tension, it is indicated that a maximum force is exerted by weight 140 on piezo force detector 145 in an opposite direction, and that heading sensor 100 is in a vertical position, but rotated at 180° from the position illustrated in FIG. 1. If no gravitational field strength is detected by interferometer 350 and optical detector 130, heading sensor 100 is in a horizontal position, rotated at about 90° from the position illustrated in FIG. 1. Thus, the measurements from force detector 145 may also be used as a secondary check on the measurements of the changes in the gravitational field strength from interferometer 350 and optical detector 130.

Heading sensor 100 may further include one or more temperature sensors 150 positioned along optical axis 165. In an exemplary embodiment, three temperature sensors 150 are included. In other embodiments, more or less temperature sensors may also be used. In an exemplary embodiment, temperature sensors 150 are positioned on opposite ends of weight 140. One temperature sensor 150 may be placed at the interface of mirror 125 and position bias actuator 155. Temperature sensors 150 positioned on opposite ends of weight 140 assist in establishing a temperature profile along optical axis 165 for weight 140 and may be used to determine thermally induced changes in the dimension of weight 140 along optical axis 165. Temperature sensors 150 detect variations in the ambient temperature, which variations are then used to filter out changes in position of mirror 125 and electric current flowing through coil 135 due to variations in temperatures rather than the changes in the strengths of the earth's local gravitational field and the earth's local magnetic field respectively.

Figure 2:
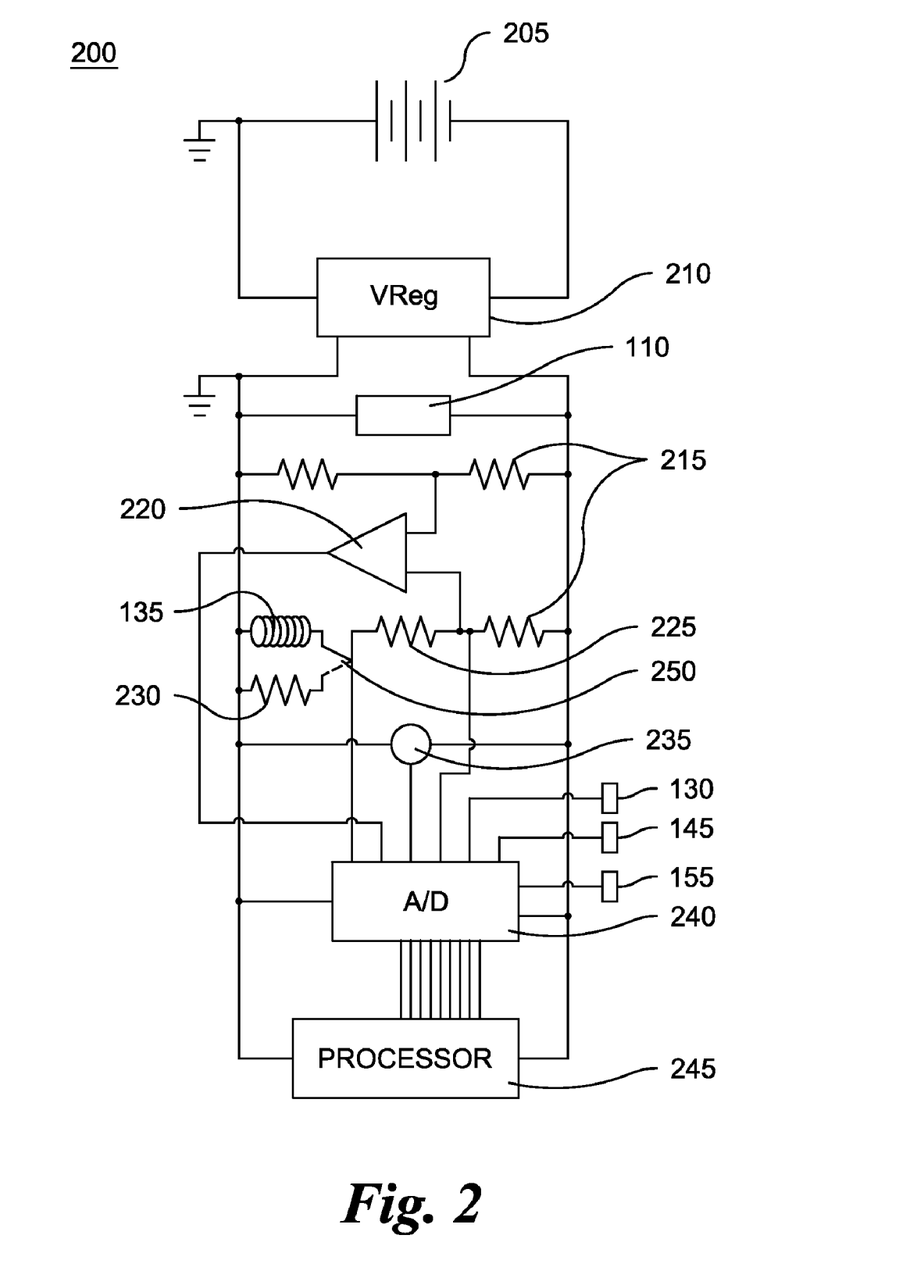
FIG. 2 is a schematic view of the control module of the heading sensor of FIG. 1, according to an aspect of the invention.

Referring now to FIG. 2, there is illustrated a schematic view of control/power module 200 illustrating the control architecture of module 200. Module 200 includes a power source or reference voltage 205, a voltage regulator 210, scaling resistors 215, a voltage comparator 220, a balance resistor 225, a coil compensating resistor 230, a switch 250, a temperature monitor 235, an analog-to-digital (A/D) convertor 240, and a processor 245. In an exemplary embodiment, reference voltage or power source 205 is a direct current (DC) source or reference. In other embodiments, an alternating current (AC) source or reference may also be used. Voltage regulator 210 regulates the voltage applied across light source 110 (of FIG. 1), scaling resistors 215, coil 135 and coil compensating resistor 230 and balance resistor 225, temperature monitor 235, A/D converter 240 and processor 245. If power source or reference voltage 205 is an AC source, voltage regulator 210 also includes a converter for converting AC into DC. In an exemplary embodiment of the invention, balance resistor 225 is an adjustable resistor. Such an adjustable balance resistor 225 allows the balancing of the resistor network with coil compensating resistor 230 in series, such that the voltage across one side of voltage comparator 220 is equal to the voltage across the other side of voltage comparator 220 in a steady magnetic field. Switch 250 is used to calibrate the resistor network in a known magnetic field using coil compensating resistor 230. As shown, switch 250 is operated to either switch in coil 135 and switch out coil compensating resistor 230 or to switch in coil compensating resistor 230 and switch out coil 135. When the fluctuations in the earth's local magnetic field strength are to be measured, coil 135 may be switched in via switch 250. Thus, in an operational stage of sensor 100, coil 135 is switched on. In an exemplary embodiment of the invention, the ideal resistance of coil 135 is equal to the ideal resistance of coil compensating resistor 230.

Voltage comparator 220 compares voltages across scaling resistors 215 and voltage across coil 135 and coil compensating resistor 230 and balance resistor 225. The fluctuations in the electrical current flowing through coil 135 responsive to changes in an ambient magnetic field (for example, the earth's local magnetic field) results in variations in voltage across coil 135 and associated resistors 225, 230. Such fluctuations in the magnetic field strength are functions of the position and the orientation of heading sensor 100. The position of heading sensor 100 is the latitude and the longitude of heading sensor 100. Thus, the output of voltage comparator 220 is indicative of a change in the magnetic field strength and is fed to A/D convertor 240. Temperature sensors 150 (of FIG. 1) are electrically coupled to temperature monitor 235. The output of temperature monitor 235 is also fed to A/D convertor 240. A/D convertor 240 also receives outputs from optical detector 130 (of FIG. 1), force detector 145 (of FIG. 1), and position bias actuator 155 (of FIG. 1).

Figure 3:
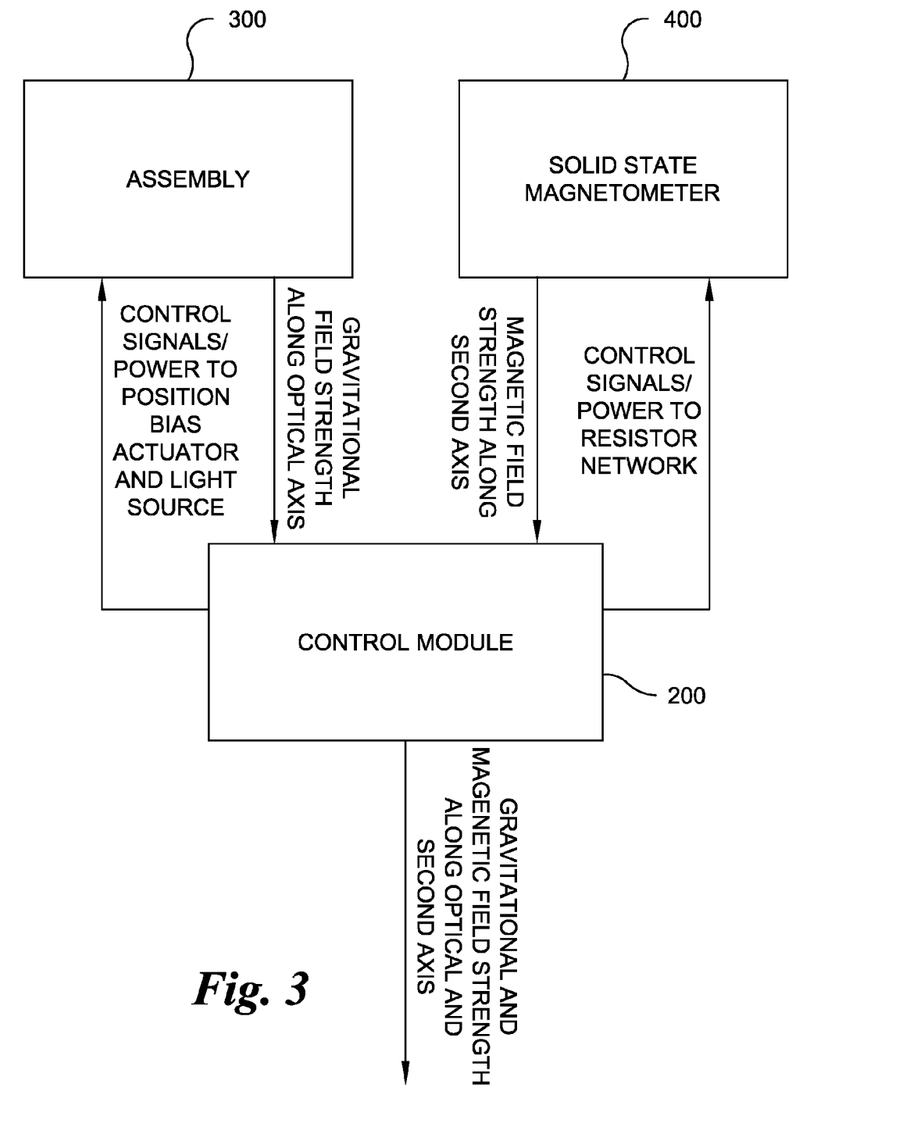
FIG. 3 is an exemplary block diagram and process flow of the heading sensor of FIG. 1.

Referring now to FIG. 3, an exemplary block diagram of heading sensor 100 is illustrated. Interferometer assembly 300 provides an output indicative of a measured gravitational field strength based on the position of mirror 125 (of FIG. 1) along optical axis 165 (of FIG. 1). The movement of mirror 125 (of FIG. 1) along optical axis 165 (of FIG. 1) goes as the strength of the earth's local gravitational field along optical axis 165 (of FIG. 1) and results in a change in the length of light path of light beam 113 (of FIG. 1). The change in length of the light path of beam 113 (of FIG. 1) is manifested as the interference of the light beams 112, 113 (of FIG. 1) associated with the phase difference therebetween. Magnetometer 400 provides an output indicative of a measured change in the earth's local magnetic field strength along second axis 166 (of FIG. 1) of sensor 100 (of FIG. 1) based on the current fluctuations in electromagnetic coil 135 (of FIG. 1). Control module 200 receives the output signals from interferometer assembly 300 and magnetometer 400 and processes the received signals to determine the sign and magnitude of the earth's local magnetic and gravitational fields along second axis 166 and optical axis 165 of sensor 100 respectively. Control module 200 generates a digital output representative of gravitational field strength and magnetic field strength. Processor 245, based on inputs from A/D convertor 240, determines and generates an output indicative of the earth's local magnetic and gravitational field strengths along second axis 166 and optical axis 165 of heading sensor 100 based on the measurements of interferometer assembly 300 and magnetometer 400.

Figure 4:
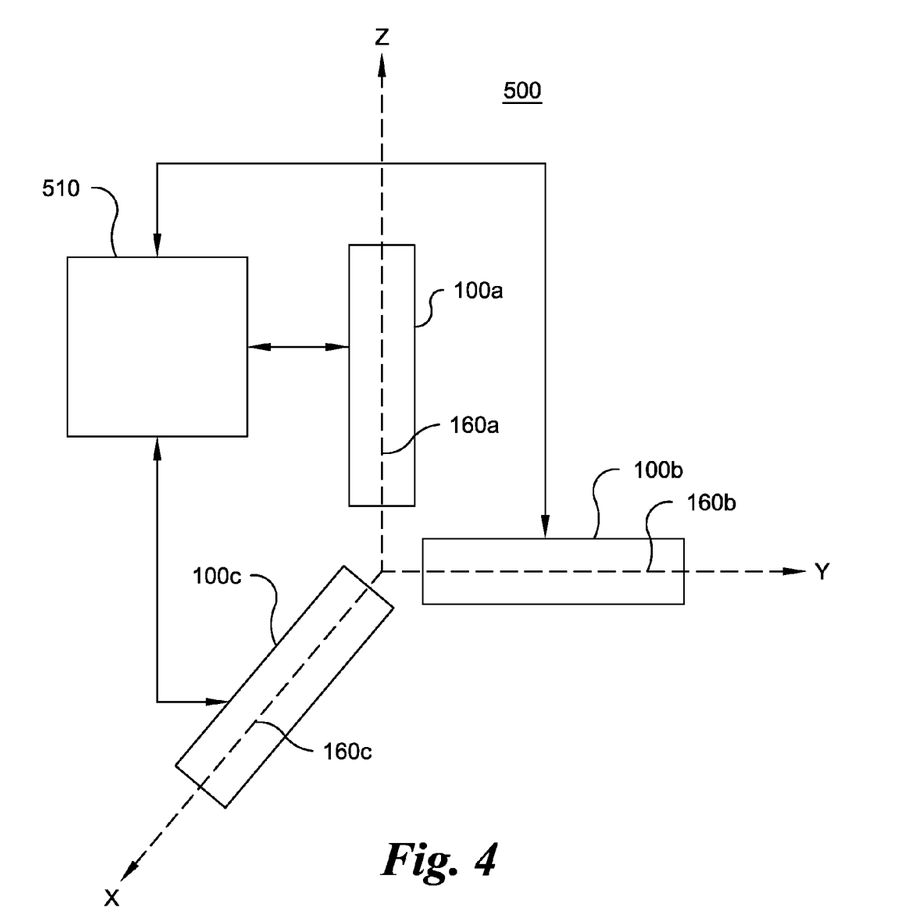
FIG. 4 is an exemplary block diagram of a heading sensor assembly for determining the heading of an object using three heading sensors arranged orthogonally, according to an embodiment of the invention.

Referring now to FIG. 4, a heading sensor assembly 500 is schematically illustrated. In an exemplary embodiment, assembly 500 includes three heading sensors 100*a*, 100*b*, 100*c* and a processor 510. In an exemplary embodiment, central axes 160*a*, 160*b*, 160*c* of heading sensors 100*a*, 100*b*, 100*c* respectively are generally orthogonal to each other. In the illustrated embodiment, optical axes and second axes of each of three heading sensors 100*a*, 100*b*, 100*c* coincide with central axes 160*a*, 160*b*, 160*c* of sensors 100*a*, 100*b*, 100*c*. In the illustrated embodiment, central axis 160*a* is aligned with Z-axis, central axis 160*b* is aligned with Y-axis and central axis 160*c* is aligned with X-axis of a right-handed Cartesian coordinate system. Each sensor 100*a*, 100*b*, 100*c* measures the earth's local magnetic field strength and gravitational field strength along its central axis 160*a*, 160*b*, 160*c* respectively. The outputs of sensors 100*a*, 100*b*, 100*c* are provided to a processor 510. Processor 510 then determines the orientation and the position of assembly 500 based on the earth's local magnetic and gravitational field strength components along the three generally orthogonal axes X, Y, Z. In other embodiments, central axes 160*a*, 160*b*, 160*c* may not be orthogonal to each other so long as the angles between central axes 160a, 160b, 160c and the relative positions of sensors 100a, 100b, 100c are known.

Figure 5:
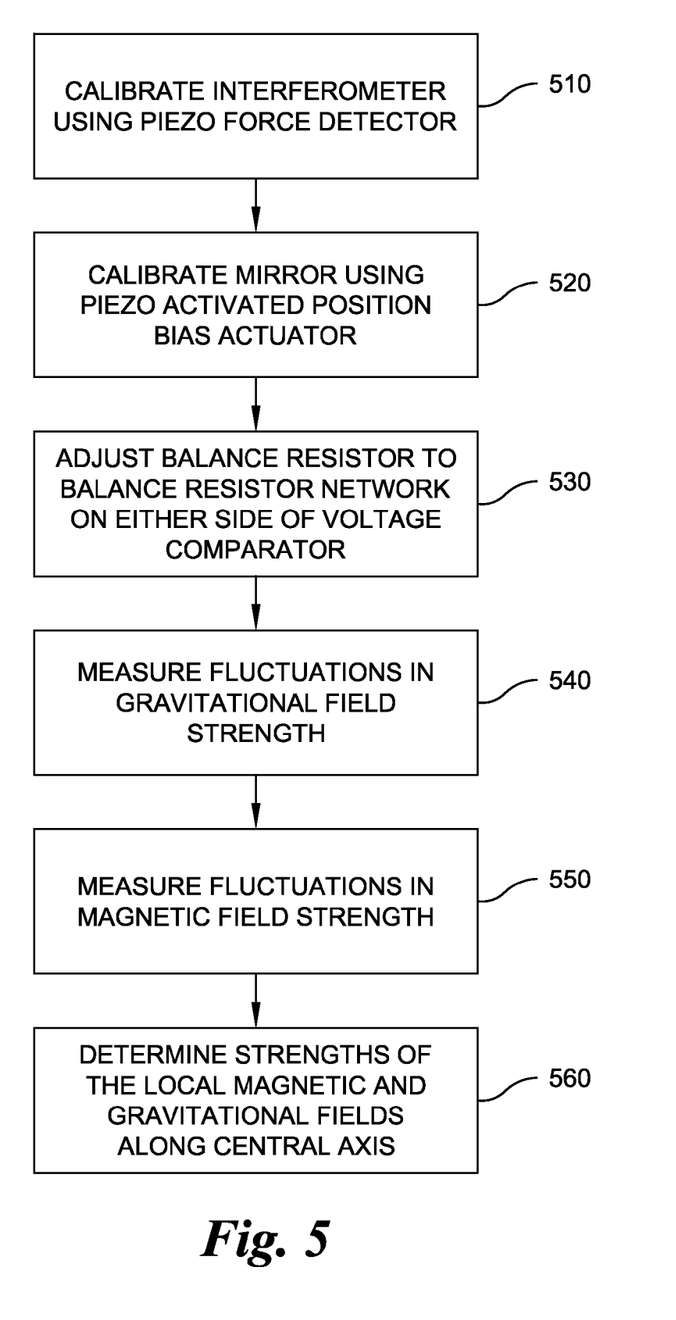
FIG. 5 is a process flow diagram illustrating the functioning of the heading sensor of FIG. 1, according to an aspect of the invention.

Referring now to FIGS. 1, 2 and 5, a process flow chart is illustrated which depicts the functioning of heading sensor 100 using an interferometer assembly 300 (of FIG. 3) and a solid-state magnetometer 400. At block 510, interferometer assembly 300 (of FIG. 3) is calibrated in a gravitational field having known strength using piezo force detector 145 to compensate for variations, for example, in the weight and the length of weight 140, and thickness of mirror 125. The position of mirror 125 is calibrated using piezo activated bias position actuator 155, at block 520. Balance resistor 235 is adjusted to balance the resistor network, which is ensured by equalizing the voltages on either side of voltage comparator 220, at block 530. Interferometer assembly 300 (of FIG. 3) measures the fluctuations in the strength of gravitational field, at block 540. Solid state magnetometer 400 measures the fluctuations in the strength of the earth's local magnetic field, independently, at block 550. Based on the independent measurements of interferometer assembly 300 and magnetometer 400, control module 200 determines, and generates an output indicative of the earth's local gravitational field and magnetic field along central axis 160 of heading sensor 100, at block 560.

Figure 6:
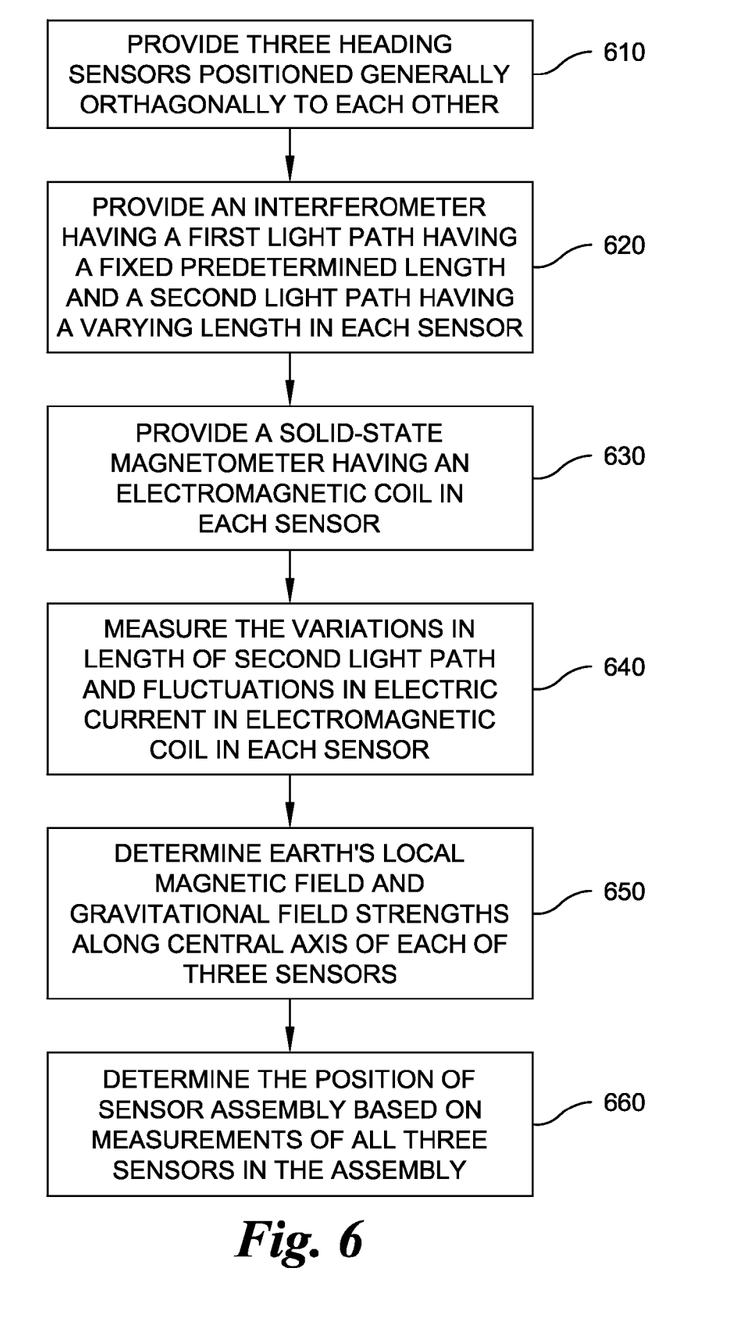
FIG. 6 is a process flow diagram for determining the position and the orientation of a heading sensor.

Referring now to FIGS. 1, 4, and 6, a method of determining the position and the orientation of a heading sensor assembly 500 according to an aspect of the invention is described. At block 610, three heading sensors are positioned generally orthogonally to each other. The method includes a step of providing an interferometer in each of the three sensors, at block 620. The interferometer has two light paths. The first light path has a fixed predetermined length. The second light path is adapted to vary responsive to a change in the strength of an ambient gravitational field. The method also includes a step of providing a solid-state magnetometer in each of the three sensors, at block 630. The solid-state magnetometer has an electromagnetic coil. An electric current in the electromagnetic coil fluctuates responsive to the change in the strength of an ambient magnetic field and the orientation of the electromagnetic coil relative to the ambient magnetic field. At block 640, the variations in the length of second light path and the fluctuations of the electric current in the electromagnetic coil are measured for each sensor. At block 650, the earth's local magnetic field strength and the gravitational field strength along the second and the optical axis of each sensor is determined. The method further includes the step of determining the position and the orientation of the sensor assembly based on the measurements of all three sensors, at block 660.

An advantage of the exemplary heading sensor is that two different measurements, one of the ambient gravitational field strength and the other of the ambient magnetic field strength may be achieved independent of each other, using a compact structure. Based on these measurements, the position and the orientation of the exemplary heading sensor may be determined.

Although the present invention has been set forth in terms of the exemplary embodiments described herein, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the present invention be interpreted as encompassing all alterations, modifications, or alternative applications as fall within the true spirit and scope of the invention.

What is claimed is:

1. A heading sensor comprising:
a housing containing:
   a movable weight;
   an interferometer having a mirror movable in response to fluctuations in a gravitational force applied to said weight, said interferometer receiving a light beam and generating an optical signal modulated according to the relative displacement of the movable mirror; a detector for detecting said optical signal; and
   an electromagnetic coil positioned along an axis of said housing for generating a current signal indicative of fluctuations in a magnetic field applied to said housing; and
a processor for determining a local gravitational field component according to said detected signal, and for determining a local magnetic field component according to said current signal.

2. The heading sensor of claim 1, wherein said electromagnetic coil and said interferometer are adapted in a stack configuration.

3. The heading sensor of claim 1, wherein said weight is operatively coupled to said movable mirror, and wherein said electromagnetic coil is disposed about said weight.

4. The heading sensor of claim 3, further comprising a position bias actuator coupled between said movable mirror and said weight for calibrating an offset displacement for said movable mirror.

5. The heading sensor of claim 4, further comprising a force detector coupled to said weight.

6. An optical solid-state heading sensor comprising:
a housing containing:
   an interferometer comprising:
      a beam splitter arranged along an optical axis to receive a light beam from a light source and to split said light beam into first and second light beam components;
      a first mirror positioned at a fixed predetermined distance from said beam splitter; and
      a second mirror movably positioned with respect to said beam splitter and operatively coupled to a movable weight for moving along the optical axis responsive to an ambient gravitational field; wherein said first and second mirrors are configured to recombine said first and second light beam components into a resultant beam modulated according to the position of the movable mirror;
   an optical detector, responsive to said resultant beam for generating an output signal indicative of said modulation;
   an electromagnetic coil for generating an electric current responsive to an ambient magnetic field, said electromagnetic coil positioned along a second axis; and
   a control module that determines the strength of said ambient gravitational field along the optical axis, according to said output signal from said optical detector, and that determines the strength of said ambient magnetic field along the second axis, according to fluctuations in said electric current.

7. The optical solid-state heading sensor of claim 6, wherein said housing further includes a coherent light source for generating said light beam.

8. The optical solid-state heading sensor of claim 7, wherein said coherent light source is a laser source.

9. The optical solid-state heading sensor of claim 6, said housing further comprising:
a force detector, said force detector adapted to detect force exerted on said weight by said ambient gravitational field; and
a position bias actuator mechanically coupled to said second mirror, said position bias actuator adapted to move said second mirror responsive to a signal from said control module.

10. The optical solid-state heading sensor of claim 9,
wherein said housing is generally cylindrical having a central axis,
wherein said optical axis and said second axis coincide with the central axis, and
wherein said electromagnetic coil is positioned around said weight, and
said light source, said interferometer, said second mirror, said weight, said electromagnetic coil, and said force detector are aligned along said central axis of said housing.

11. The optical solid-state heading sensor of claim 6, wherein said control module is positioned within said housing.

12. The optical solid-state heading sensor of claim 6, wherein said control module generates a digital output indicative of the strength of said ambient magnetic field.

13. The optical solid-state heading sensor of claim 6, wherein said control module generates a digital output indicative of the strength of said ambient gravitational field.

14. The optical solid-state heading sensor of claim 6, further comprising a temperature sensor.

15. The optical solid-state heading sensor of claim 6, said control module further comprising:
a coil compensating resistor; and
a switch adapted to electrically couple either said electromagnetic coil or said coil compensating resistor to a resistor network in said control module.

16. The optical solid-state heading sensor of claim 6, said control module further comprising an adjustable balance resistor.

17. An inertial measurement sensor comprising:
a beam splitter arranged to receive a light beam from a coherent light source and to split said light beam into first and second light beam components;
a first mirror positioned at a fixed predetermined distance from said beam splitter;
a second mirror movably positioned with respect to said beam splitter;
wherein said first and second mirrors are configured to recombine said first and second light beam components into a resultant beam modulated in amplitude according to the position of the movable mirror;
an optical detector positioned to receive said amplitude modulated resultant beam and generating an output signal indicative of said modulation;
a position bias actuator mechanically coupled to said second mirror;
a weight coupled to said position bias actuator; and
a control module adapted to control at least an initial position of said second mirror relative to said beam splitter, using said position bias actuator, the position of said second mirror changing responsive to changes in the strength of an ambient gravitational field.

18. The inertial measurement sensor of claim 17, wherein said coherent light source is a laser.

19. The inertial measurement sensor of claim 17, further comprising a force detector, said force detector adapted to detect force exerted on said weight by said ambient gravitational field.

20. A heading sensor comprising:
a housing containing:
an interferometer configured to direct test light onto a surface and subsequently recombine it with reference light to form a combined light beam having an interference pattern, the test and reference light deriving from a common coherent light source, the interferometer including a mirror movable in response to fluctuations in a gravitational force applied to said housing, said combined light beam interference pattern modulated according to the relative displacement of said movable mirror; and
an electromagnetic coil positioned along an axis of said housing for generating a current signal indicative of fluctuations in a magnetic field applied to said housing; and
a processor for determining a local gravitational field component according to said optical signal, and a local magnetic field component according to said current signal.

21. The heading sensor of claim 20, wherein said electromagnetic coil and said interferometer are in a stack configuration.

22. The heading sensor of claim 20, wherein a weight is operatively coupled to said mirror, and
wherein said electromagnetic coil is disposed around said weight.

23. The heading sensor of claim 22, further comprising a position bias actuator coupled between said mirror and said weight for calibrating an offset displacement for said mirror.

24. The heading sensor of claim 23, further comprising a force detector coupled to said housing and said weight.

25. A sensor assembly comprising first, second, and third heading sensors arranged orthogonal to one another, each of said first, second, and third sensors comprising:
a housing containing:
a movable weight and an interferometer having a mirror movable in response to fluctuations in a gravitational force applied to said weight within said housing, said interferometer configured to direct test light onto a surface and subsequently recombine it with reference light to form an output optical signal having an interference pattern, the test and reference light deriving from a common coherent light source, said output optical signal modulated according to the relative displacement of said movable mirror; and
an electromagnetic coil positioned along an axis of said housing for generating a current signal indicative of fluctuations in a magnetic field applied to said housing; and
a processor that determines a local gravitational field component according to said optical signal, and a local magnetic field component according to said current signal.

26. A method for determining a heading comprising the steps of:

in a first device having first, second, and third interferometers each having a mirror movable along first, second, and third optical axes respectively, determining a local gravitational field strength component along each of said first, second, and third optical axes using said mirrors, wherein each of said mirror moves along said respective optical axes responsive to and proportional to fluctuations in the strength of the local gravitational field along said optical axes;

in said first device further having first, second, and third electromagnetic coils positioned along first, second, and third coil axes of the first device respectively, determining a local magnetic field strength component along each of first, second, and third coil axes, wherein each of said electromagnetic coils generates a current signal indicative of fluctuations in the strength of the local magnetic field along said coil axes; and determining the strengths of the local gravitational field and the local magnetic field, based on said mirror movements and said current signals, for determining a heading of said first device.

27. The method of claim 26, wherein said first, second and third optical axes coincide with said first, second and third coil axes respectively, and wherein said first, second, and third optical axes are generally orthogonal to one another.

* * * * *